April 23, 1963 A. E. UHLEEN 3,086,904

METHOD FOR APPLYING ORGANIC FILM TO ADHESIVELY COATED METAL STRIP

Filed May 13, 1958

INVENTOR.
ARTHUR E. UHLEEN

BY Shanley & O'Neil

ATTORNEYS

United States Patent Office 3,086,904

Patented Apr. 23, 1963

3,086,904

METHOD FOR APPLYING ORGANIC FILM TO ADHESIVELY COATED METAL STRIP

Arthur E. Uhleen, Allentown, Pa., assignor to National Steel Corporation, a corporation of Delaware Filed May 13, 1958, Ser. No. 735,034
10 Claims. (Cl. 156—320)

Figure 1:
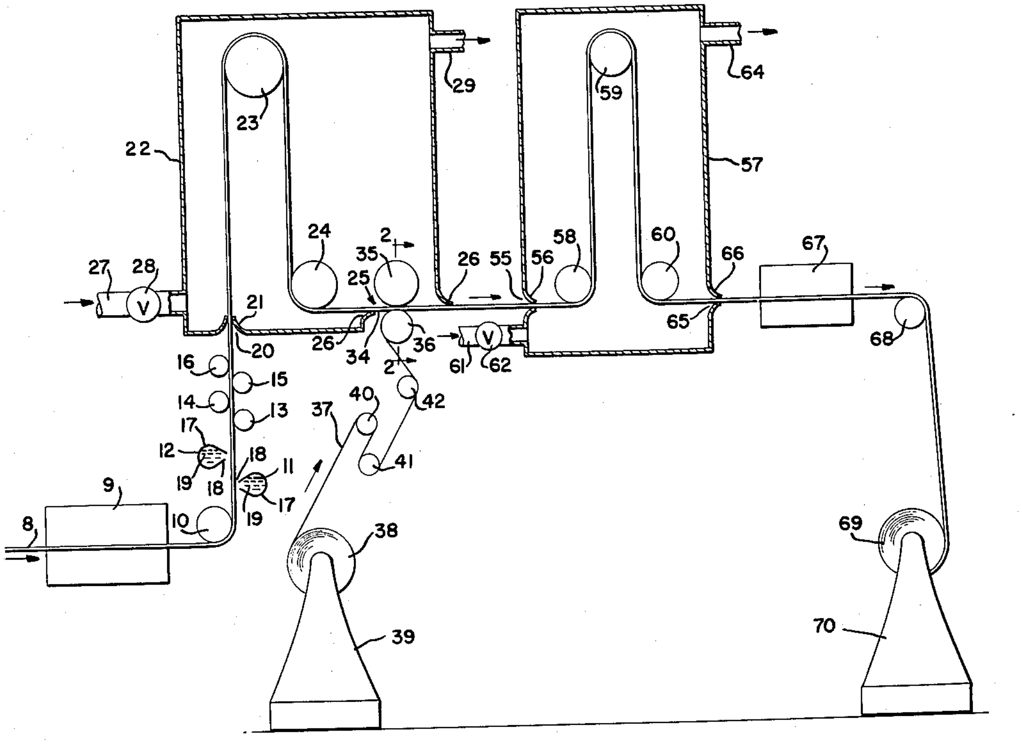

This invention relates to a novel method of applying organic film material to sheet material and, in one of its more specific embodiments, the invention further relates to a novel method of applying a tightly adhering organic film material to one side of metal sheet material and a hardened organic finish to the other side of the metal sheet material.

Organic film material is generally applied to metal sheet by coating a surface of the metal sheet with a suitable adhesive for organic film dissolved in a solvent, heat curing the coating of adhesive composition to drive off solvent and render the resulting thin film of adhesive soft and receptive with excellent bonding properties, and then applying the organic film material to the hot metal surface having cured adhesive thereon under sufficient pressure to assure that the organic film adheres to the metal surface. When following prior art practice, the pressure is applied to the metal sheet and organic film during application thereof by means of a pair of rubber covered pressure rolls after withdrawing the cured adhesive-coated metal sheet from the heating zone.

The prior art practice was not satisfactory in several respects. For example, it was not possible to produce a high quality metal laminate from very thin sheet metal, such as sheet metal having a thickness of about 0.01 inch. In addition, the importance of providing substantially parallel opposing surfaces on the pressure rolls and a relatively firm and unyielding back-up roll surface for contacting the metal sheet and a relatively soft and yielding pressure roll surface for contacting the organic film was not recognized. As a result, the metal laminate products of the prior art were characterized by relatively poor adhesion of the organic film to the metal sheet, and non-uniform bonding. Thus, when the prior art products were subjected to strenuous forming operations, the laminate was damaged.

The present invention overcomes the above-mentioned as well as other disadvantages and limitations of the prior art. In accordance with the present invention, a uniform bond between the organic film and the metal sheet is produced which is characterized by greatly increased strength and an ability to undergo strenuous forming operations without rupture of the bond or other damage to the metal laminate. The organic film is applied to the adhesive-coated surface of the metal sheet by passing the metal sheet and organic film between first and second substantially parallel opposing surfaces under pressure. The first opposing surface, which is pressed against the metal sheet, is relatively firm and unyielding such as the surface of a metal roll; while the second opposing surface, which is pressed against the organic film, is relatively soft and yielding such as the surface of a rubber roll having a hardness of about 45 durometers. As a result of the foregoing, with or without the application of heat to at least one of the opposing surfaces and/or the metal strip during the application of the organic film, the bond between the organic film and metal sheet is improved markedly. The resulting metal laminate product is outstanding in its ability to withstand strenuous forming operations and thus it is a highly desirable product.

It is an object of the present invention to provide a novel method for applying organic film material to sheet material.

It is a further object of the present invention to provide a novel method for applying vinyl film to sheet material.

It is still a further object of the present invention to provide a novel method for applying organic film material and an organic finish to opposite sides of sheet material.

It is still a further object of the present invention to provide a novel method for applying vinyl resin film material and an organic finish to opposite sides of sheet material.

Figure 2:
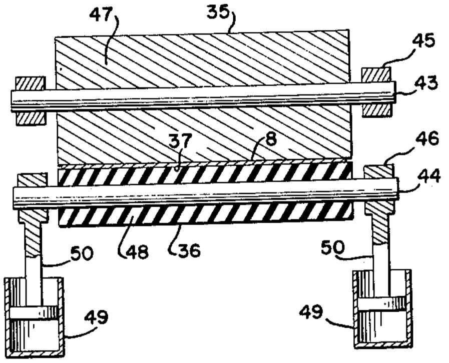

Still other objects and advantages of the present invention will be apparent to those skilled in the art upon reference to the following detailed description and the drawing, wherein:

FIGURE 1 is an elevational view diagrammatically illustrating suitable apparatus for use in practicing the present invention; and FIGURE 2 is an enlarged cross-sectional view taken along the line 2—2 of FIGURE 1.

Referring now to the drawings and more particularly to FIGURE 1, the ferrous metal strip 8 preferably has been given a suitable pre-treatment such as, for example, as disclosed in my copending application Serial No. 734,995, filed May 13, 1958, for "Method of Coating Sheet Material," now United States Patent No. 3,032,459.

In general, any suitable pre-treatment may be used which results in a clean, attractive metallic surface characterized by good corrosion resistance and good organic finish and adhesive bonding properties. Usually, such pre-treatments will comprise a suitable wet treatment for removal of foreign substances from the metal surface, followed by treatment in at least one solution containing phosphate and/or chromate to provide a passivated surface provided with a phosphate film and characterized by good corrosion resistance and improved organic finish and adhesive bonding characteristics. When the metal is ferrous metal, preferably the phosphate content of the phosphate-containing film resulting from the pre-treatment should be substantially below 200 mgs./100 sq. ft. and generally it should not exceed about 100 mgs./100 sq. ft. For best bonding properties with ferrous metal usually, the phosphate film should contain about 5–10 mgs. of phosphate/100 sq. ft. For metals other than ferrous metal, such a pre-treatment may differ somewhat for the pre-treatment described above for ferrous metal. For example, when the metal is aluminum, the pre-treatment may comprise treatment in an alkaline solution at 130–190° F. to remove foreign substances from the metal surface, followed by an aqueous rinse and treatment in a dilute aqueous solution containing phosphoric acid and chromic acid at a temperature of 130–190° F. to passivate the surface, improve bonding characteristics, and remove additional foreign substances from the metal surface. Also, where the metal to be pre-treated is galvanized ferrous metal, tinplate, etc., the metal may be given a pre-treatment to remove oils and other foreign substances from the metal surface, followed by treatment in an aqueous solution containing a small amount of chromic acid.

The pre-treated ferrous metal strip 8 is passed through unit 9 wherein the strip is heated within limits to be fully discussed hereinafter. The temperature-adjusted strip 8 is passed under roll 10 and upward past adhesive composition and organic finish composition applicators 11 and 12, leveling rolls 13 and 14, and metering rolls 15 and 16 to thereby provide one side of the strip 8 with a uniform coating of adhesive of a closely controlled desired thickness and the opposite side of the strip 8 with a uniform coating of organic finish which is likewise of a closely controlled desired thickness.

The applicators 11 and 12 preferably are of the type disclosed in U.S. Patent No. 2,784,697, issued March 12, 1957, to Arthur E. Uhleen; while a presently preferred construction for leveling rolls 13 and 14 and metering rolls 15 and 16 and method of applying a coating of the organic finish composition and adhesive composition are disclosed in application Serial No. 516,168, filed June 17, 1955, on behalf of Arthur E. Uhleen and entitled "Method of Coating Strip Materials with Paints or Enamels," now Patent No. 2,961,336. The applicators disclosed in U.S. Patent No. 2,784,697 are so designed as to be capable of depositing fluid coating materials by a modified flow-type process wherein pools of a fluid coating material of predetermined size are maintained in contact with opposite sides of metal strip 8. The applicators 11 and 12, which are located on opposite sides of the strip 8, each may comprise an elongated hollow body member 17 positioned transversely of the metal strip 8 and each may be provided with a longitudinal nozzle 18 disposed so as to discharge against one side of the metal strip 8 and across its width. The hollow body member 17 of each applicator is fed with its respective fluid coating material 19 under pressure by means not shown to insure uniform discharge of the fluid coating material, i.e., the adhesive composition or the organic finish composition, through the nozzle 18 and across the width of the metal strip 8. Preferably, the adhesive and organic finish compositions are substantially completely homogenized and heated to a temperature approaching but less than the temperature of their respective flash points. In addition, preferably the strip 8 is heated in unit 9 to a temperature closely approximating the lower flash point of the two compositions. The temperature of strip 8 and the adhesive and organic finish compositions at the point of their application thereto may vary over a considerable range within the above described limits, but usually the temperature should be about 150–200° F. and, preferably, about 160–165° F. The leveling rolls 13 and 14 are positioned above the applicators 11 and 12 on either side of the metal strip 8 and are adapted to contact the metal strip 8 and cause a lateral displacement of adhesive or organic finish composition in such a manner as to perform a "leveling" operation; while metering rolls 15 and 16 are adapted to contact the metal strip 8 after leveling rolls 13 and 14 and control the quantity of adhesive or organic finish composition remaining on the surfaces of the strip. The preferred thickness of the coating of adhesive composition may vary over a considerable range depending, at least in part, upon the nature of the specific adhesive composition used, the viscosity of the applied adhesive composition, the surface upon which it is applied and the nature of the organic film material to be applied to the metal surface. However, usually the coating of adhesive composition preferably should be approximately 0.0005–0.001 inch in thickness, while the thickness of the coating of organic finish may vary substantially for reasons similar to those mentioned above for the adhesive composition but usually it should be about 0.0001–0.001 inch in thickness for preferred results.

After receiving coatings of the adhesive and organic finish compositions, the ferrous metal strip 8 is passed upward through entrance 20 provided with strip sealing means including flaps 21 into oven 22, and through oven 22 via a path established by guide rolls 23 and 24, back-up roll 35 and pressure roll 36. The strip 8 is then withdrawn via exit 25 provided with strip sealing means including flaps 26. While the strip 8 is shown as making only one pass in oven 22 for the purpose of simplifying the drawings, it is understood that it may make a plurality of passes to thereby increase the residence time within oven 22 at a given strip speed when it is so desired. The oven 22 may be heated by means of a hot gaseous heating medium supplied thereto via conduit 27 including control valve 28 at a controlled rate and temperature to maintain a desired temperature range within oven 22, while cooled gaseous heating medium is withdrawn from oven 22 via conduit 29. The hot gaseous heating medium preferably is supplied to and withdrawn from oven 22 at a rate at least sufficient to dilute the solvent vapors flashed off therein while heat-curing the coating of adhesive composition and heat-hardening the coating of organic finish composition to thereby maintain a non-explosive atmosphere within oven 22.

While the ferrous metal strip 8 is within oven 22, the solvent content of the coating of adhesive composition, which preferably is applied by applicator 11, is flashed off and the resulting thin coating of adhesive is heated to a temperature sufficiently high and for a period of time so as to cause the adhesive to be soft and receptive to the flexible organic film to be described hereinafter at the time it is applied to the strip 8, and to assure a good adherent bond between the organic film and the metal strip. In addition, the metal strip 8 may be heated to a temperature sufficiently high to assure fusion of the organic film material thereto during its application under pressure and thus tightly adhere the organic film material to the metal strip, or aid therein. The coating of organic finish composition which preferably is applied by applicator 12, must be sufficiently heat-hardened during the heat-curing or heat conditioning of the coating of adhesive composition and metal strip above described so as to not be removed during application of the organic film to the metal strip, and yet not be overcured sufficiently to result in a brittle film of hardened organic finish on the final product.

Preferably, at least the roll 23 in oven 22 is of the type disclosed in application Serial No. 612,783, filed September 28, 1956, for "Transport Roller" on behalf of Arthur E. Uhleen, and now abandoned. When using rollers in oven 22 of the type described in the above application, the freshly coated ferrous metal strip 8 does not contact the rolls 23 and 24 with the exception of a narrow edge portion along either side of the strip which engages annular raised shoulders on either end of the roll. This prevents contact of the strip with the roll other than on the edges of the strip and the accompanying marring of the freshly coated surfaces.

The ferrous metal strip 8 is withdrawn from oven 22 via exit 25 and the construction is such as for the strip to, in effect, form the bottom wall of the furnace in the vicinity of the back-up roll 35 and pressure roll 36. The strip 8 passes then between back-up roll 35 and pressure roll 36. A flexible organic film material 37, which may be of a width substantially that of strip 8, may be fed from coil 38 rotatably mounted on pedestal 39 between back-up roll 35 and pressure roll 36 at a rate substantially corresponding to the speed of strip 8 and in such a manner so as to be applied to the heat-cured adhesive-coated side 34 of strip 8. Preferably, the organic film 37 to be applied is passed over leveling and tensioning rolls 40, 41 and 42 for the purpose of leveling the organic film, removing wrinkles therefrom, and providing slight tension therein so as to assure uniform application.

Referring now to FIGURE 2, which is a detailed diagrammatic view taken along the line 2—2 of FIGURE 1, the metal shafts 43 and 44 of back-up roll 45 and pressure roll 46 are rotatably mounted on mounting means including bearings 45 and 46, respectively. The rolls 35 and 36 are provided with steel and rubber surface portions 47 and 48, respectively. Hydraulic cylinder assemblies 49 including pistons 50 are arranged at either end of shaft 44 and adapted to urge pressure roll 36 in a direction toward back-up roll 35, and thus apply a predetermined pressure on the metal strip 8 and organic film 37 as they pass between rolls 35 and 36. The amount of pressure to be applied may vary depending upon the nature of the organic film material but, in general, the amount of pressure applied should be sufficient to cause the organic film 37 to be uniformly adhered or fused to the heat-cured adhesive coated surface of strip 8. However, the pressure should not be sufficiently high to cause embossing on the organic film 37 to be washed out or the organic film itself reduced below a desired thickness. The rolls 35 and 36 may apply a pressure of about 40–100 p.s.i. on the strip 8 and organic film 37 but a pressure of about 75–85 p.s.i. is usually preferred.

In accordance with the present invention, it is essential that the organic film 37 and the cured adhesive-coated strip 8 be passed between substantially parallel opposing surfaces as herein described under pressure. The first opposing surface must be relatively firm and unyielding so as to straighten out the strip 8, prevent undue flexing of the strip, and provide a firm backing while the organic film 37 is applied under pressure, and the second opposing surface must be relatively soft and yielding so as to assure a uniform pressure across the surface of the organic film 37 regardless of minor differences in the thickness of the film, adhesive coating, metal strip, etc. The first opposing surface above mentioned is pressed against the strip 8, while the second opposing surface is pressed against the organic film 37.

Preferably, the opposing surfaces are the surfaces of a pair of rolls such as back-up roll 35 and pressure roll 36. The opposing surfaces of rolls 35 and 36 are preferably smooth and substantially parallel and are reworked at intervals sufficiently frequent to assure that the opposing roll surfaces remain smooth and parallel since otherwise optimum results are not obtained. The surface of back-up roll 35 preferably is formed of polished metal, such as polished steel, while the surface of pressure roll 36 preferably is formed of rubber. The term "rubber" as used herein is intended to include natural rubber, as well as suitable synthetic rubbery materials. Preferably, a high temperature synthetic rubber should be used such as Neoprene, which is a rubbery polymer of chloroprene; or Hypalon, which is a rubbery polymer of chlorosulfonated polyethylene. The hardness of the rubber is of importance, but it may vary over considerable limits. Satisfactory results are obtained when the hardness is about 30–55 durometers, but preferably the hardness should be about 45–50 durometers for organic film having little or no embossing and about 35 to 40 durometers for organic film having deep embossing.

Application of the organic film 37 to strip 8 using the above described procedure results in an adhesive bond of greatly increased strength, as well as in an adhesive bond characterized by a much more uniform strength. Thus, the bond does not fail in spots when the product of the present invention is subjected to forming operations.

It will be noted that the polished steel back-up roll 35 is arranged within the furnace 22, while the rubber pressure roll 36 is arranged completely out of the furnace so as to increase the roll life. This arrangement allows roll 35 to be heated by the gaseous heating medium supplied to oven 22 and thus assures that the strip 8 will not be cooled below the optimum temperature for application of the organic film. Also, the film itself may receive heat from the oven 22 immediately before or while the organic film 37 is being applied. By arranging the apparatus in this manner, it is possible to apply organic film to very thin metal sheet, such as metal sheet about 0.01 inch in thickness. Heretofore, this was not possible when operating in accordance with prior art practice.

After application of organic film material 37 to strip 8, the coated hot strip 8 is passed through entrance 55 provided with strip sealing means including flaps 56 into cooling unit 57, and then through cooling unit 57 via a path defined by rolls 58, 59 and 60. The strip 8 may be cooled while within cooling unit 57 to a temperature below the flow temperature of the adhesive and, preferably, to approximately room temperature by means of atmospheric air supplied thereto at a controlled rate via conduit 61 including control valve 62, the warmed air being removed therefrom via conduit 64. The cooled strip 8 is withdrawn from cooling unit 57 via exit 65 provided with strip sealing means including flaps 66 and it may be passed to slitter 67 where the edges of the strip 8 are trimmed and, if desired, the strip 8 may be cut into a plurality of widths. The strip 8 then passes over guide roll 68 and onto coil 69 which is rotatably mounted on pedestal 70.

The flexible organic film 37 which may be applied to a heat resistant substrate in accordance with the invention may be any of a large number of suitable materials such as thermoplastic "vinyl" resin film, including vinyl chloride film as well as vinyl chloride film modified with other ingredients, such as by copolymerizing therewith vinylidene chloride or vinyl acetate, or vinyl chloride polymers modified with added material such as acrylonitrile-butadiene copolymers. The vinyl film may be plasticized, and/or it may contain suitable pigments, fillers, etc., or little or none of these substances may be present. Films of methyl methacrylate polymers, cellulose acetate or cellulose nitrate fabric-backed films, or synthetic rubber-based materials, preferably in strip form, also may be used. The term "film" as used in the specification and claims is intended to include suitable flexible materials is sheet form which may be referred to in the art as "sheet," as well as materials referred to as "film." These materials are generally classified in accordance with their thicknesses, with sheet materials usually being defined as materials having a thickness of 0.008 inch or greater, and with film being defined as materials having a thickness less than 0.008 inch. In general, films as thin as 0.004 inch may be deposited satisfactorily in accordance with the invention, and films many times as thick may be used, if desired. Preferably, the film should have a thickness of about 0.004–0.020 inch and it may be embossed or plain. The preferred organic film material is vinyl film. Vinyl films having a thickness of about 0.008 inch have been found to give excellent results.

The preferred adhesive composition to be used in the present invention will vary somewhat with the nature and composition of the organic film material. Generally, the adhesive composition may be a heat-curable adhesive composition including suitable thermoplastic resins, or thermosetting or "heat-conditionable" resins which are useful as adhesives and, preferably, such resins should be relatively high temperature materials. A large number of suitable adhesive compositions are known to the art and usually specific adhesives are preferred for a given type of organic film material. For example, a number of very satisfactory adhesive compositions for vinyl film are disclosed in U.S. Patent No. 2,329,456, issued September 14, 1943, to William E. Campbell, Jr. The specific adhesive compositions selected should have a heat-curing cycle with the temperature of heating and the period of heating during the cycle being such as to flash off solvent and render the resulting film of adhesive soft and pliable with good adhesive properties, and with the temperature and period of heating during the cycle being such as to allow the organic finish to heat-harden without the organic finish being overcured. In addition, the heat-curing cycle and/or the adhesive properties should be such as to allow sufficient time for the metal strip to reach a preferred temperature without overcuring the adhesive, which often is a temperature slightly below the temperature at which embossing is washed out when a thermoplastic film is being applied. With heavier metal substrates, the required period of heating at a given temperature to reach a desired metal temperature is greater than with thinner metal substrates.

The organic finish selected will depend at least to some extent upon the heat-curing cycle for the particular adhesive composition selected since the coating of organic finish composition must be cured at the time when the strip 8 is passed between rolls 35 and 36 and the organic film applied thereto. Otherwise, the coating of organic finish will be marred or completely removed. In addition, the organic finish selected preferably should not overcure during the heat-curing cycle for the coating of adhesive composition and heat conditioning strip 8, since it would then be brittle and have unsatisfactory forming characteristics. Preferably, the particular heat-hardenable industrial paint, lacquer, varnish, enamel, or other suitable industrial finish, selected should be formulated to have a heat-hardening cycle closely approximating the heat-curing cycle for the adhesive composition selected. The heat-hardening cycle of organic finishes may be varied or controlled to a large extent by formulations and methods well known in the art and, in addition, further steps may be taken to reduce the heat-hardening cycle by pre-heating the metal strip 8, reducing solvent content, etc., such as herein practiced.

When vinyl film is being applied to ferrous metal sheet material having a thickness of about 0.01–0.04 inch, the oven 22 may be maintained at a temperature of about 400–650° F. with the residence time of the strip within the oven 22 being about 30 seconds to 2 minutes. Usually, it is preferred to operate at an oven temperature of about 500–525° F. and with a strip residence time within the oven of about 40–50 seconds. The strip temperature at the time of applying the vinyl film is of importance, and the strip temperature at the completion of heat-curing the adhesive composition and at the time of application of the vinyl film should be about 300–450° F. for satisfactory results. Best results are usually obtained at a strip temperature of about 375–425° F. at the time the vinyl film is applied. The vinyl film is applied to the strip surface having cured adhesive thereon, i.e., the adhesive is in a proper condition following the above discussed heat-curing cycle to receive and tightly adhere the organic film to the strip at a suitable strip temperature as above defined, and subjected to pressure. A satisfactory pressure is about 40–100 p.s.i., but a pressure of about 75–80 p.s.i. is usually preferred.

Specific examples of suitable organic films, adhesives and organic finish compositions which may be used are as follows:

TABLE I

*Organic Film Material*

| Ingredient: | Parts by weight |
|---|---|
| (A) | |
| Polyvinyl chloride (35,000 avg. mol. wt.) | 100 |
| Tricresyl phosphate | 15 |
| Dioctyl phthalate | 15 |
| Lead stearate | 1.5 |
| High molecular weight alcohol wax | 1.5 |
| Lead silicate | 5.0 |
| Lead phosphite | 1.5 |
| Stearic acid | 0.25 |
| Pigment | 5.0 |
| (B) | |
| Polyvinyl chloride | 100 |
| Polyvinyl alcohol | 2 |
| Carnauba wax | 4 |
| Dibasic lead phosphite | 0.5 |
| Tribasic lead sulfate | 20 |
| Pigment | 10 |

TABLE II

*Adhesive Compositions*

| Ingredient: | Parts by weight |
|---|---|
| (A) | |
| Polyvinyl acetate-chloride copolymer having the composition 12% polyvinyl acetate, 87% polyvinyl chloride and 1% maleic anhydride and a molecular weight of 10,000–15,000 | 11.3 |
| Polybutyl methacrylate | 13.1 |
| Polyisobutyl methacrylate | 5.6 |
| Butyl acetate | 21 |
| Methyl isobutyl ketone | 21 |
| Toluol | 14 |
| Propylene oxide | 3.5 |
| Ethyl acetate | 13.65 |

| | |
|---|---|
| (B) | |
| Polyvinyl chloride-acetate (87/12) copolymer modified with 1% maleic anhydride | 10 |
| Acrylonitrile-butadiene rubbery copolymer (35/65) | 10 |
| Methyl ethyl ketone | 60 |
| Methyl isobutyl ketone | 20 |
| | 100 |

TABLE III

*Organic Finish Compositions*

| Ingredient: | | |
|---|---|---|
| (A) | | |
| Titanium dioxide | parts by weight | 300 |
| Dehydrated castor oil alkyd resin | do | 450 |
| Melamine resin 50/50 | do | 150 |
| Xylol | do | 100 |
| Viscosity (Ford #4 cup at 80° F.) | seconds | 110 |
| (B) | | |
| Titanium dioxide | parts by weight | 950 |
| Zinc oxide | do | 50 |
| Alkyd resin (#1) | do | 820 |
| Urea-formaldehyde resin (#4) | do | 820 |
| Xylol | do | 820 |
| Butanol | do | 546 |
| Petroleum naphtha (high solvency #40) | parts by weight | 1029 |
| Non-volatile content | percent | 52.8 |
| Viscosity (#4 Ford cup at 80° F.) | seconds | 22 |
| Pigment/binder ratio (by weight) | | 1/1.64 |

The product of the present invention is capable of being subjected to strenuous after-forming operations without damage to either the hardened organic finish or the tightly adhering organic film material. For example, the product of the present invention is capable of making a 180° seam or a "Pittsburgh lock" seam without damage. Thus, the process of the present invention is capable of producing a superior product and much more economically than heretofore possible.

While ferrous metal strip has been referred to in the foregoing specific description, it is expressly understood that other metals may be used such as aluminum, tinplate, zinc coated ferrous metal, etc. The foregoing materials may be in the form of flexible sheet or strip and of any suitable thickness. However, a thickness of about 0.010–0.040 inch is usually preferred. In addition, still other satisfactory heat resistant substances may be used.

It is expressly understood that the accompanying illustrative drawing, the foregoing detailed description and the following specific example are for purposes of illustration only, and are not intended as limiting to the spirit or scope of the appended claims.

EXAMPLE

Ferrous metal strip having a thickness of 0.020 inch was pretreated at 160° F. for 15 seconds with scrubbing in a sodium orthosilicate solution to remove foreign materials from the surface, followed by a water rinse and treatment at 160° F. for 15 seconds with scrubbing in a 2% phosphoric acid solution containing a detergent. The strip was then rinsed with water, treated for 15 seconds at 160° F. in a solution containing 4 ounces of phosphoric acid and chromic acid for each 500 gallons of solution, and dried at 160° F. to remove moisture from the strip surface.

The pretreated strip was heated to 165° F. and a 0.0007 inch coating of the adhesive composition "A" of Table II and a 0.0005 inch coating of the organic finish "A" of Table III were applied. The thus coated strip was heated in an oven maintained at a temperature of about 500–

520° F. for a period of about 40–45 seconds to heat-cure the coating of adhesive and heat-harden the coating of organic finish. The strip was at a temperature of about 385–400° F. at the end of the heat treatment. A 0.008 inch lightly embossed vinyl film of composition "A" of Table I was applied immediately to the surface area of the strip having cured adhesive thereon under a pressure of 80–85 p.s.i. to tightly adhere the vinyl film to the strip. The back-up roll was a polished steel roll and the pressure roll contacting the organic film was a "Hypalon" rubber coated roll having a surface hardness of about 45 durometers. The opposing surfaces of the two rolls were substantially parallel. The resulting laminate was then cooled to room temperature using atmospheric air as the cooling agent.

The resulting product was subjected to strenuous forming operations without damage to either the hardened organic finish or the tightly adhering organic film.

What is claimed is:

1. In a method of preparing a laminate wherein a surface area of metal strip is coated with an adhesive which is heat curable, the adhesive coated metal strip is heated to an elevated curing temperature to cure the adhesive, organic film is applied on the cured adhesive while the strip is at elevated temperature, the organic film and the metal strip while it is at elevated temperature are subjected to a laminating pressure to adhere the organic film to the adhesive coated metal strip and the resultant laminate is cooled, the improvement in applying the laminating pressure comprising disposing the metal strip and the organic film between a pair of substantially parallel opposing surfaces, one of the opposing surfaces being relatively firm and unyielding and the other being relatively soft and yielding under the laminating pressure, the soft and yielding opposing surface being formed of a rubbery polymer having a hardness not greater than about 55 durometers, the relatively firm and unyielding opposing surface having a hardness substantially greater than the soft and yielding opposing surface, and applying laminating pressure to the metal strip and organic film with the opposing surfaces, the relatively soft and yielding opposing surface applying pressure to the organic film and the relatively firm and unyielding opposing surface applying pressure to the side of the metal strip opposite the side having the adhesive coated surface area with organic film thereon.

2. The method of claim 1 wherein the organic film is vinyl resin film.

3. The method of claim 1 wherein the metal strip is flexible ferrous metal strip.

4. The method of claim 1 wherein the metal strip has a thickness of about 0.01–0.04 inch.

5. The method of claim 1 wherein the firm and unyielding opposing surface is formed of metal.

6. The method of claim 1 wherein the firm and unyielding opposing surface is formed of metal and the soft and yielding opposing surface has a hardness of about 30–55 durometers.

7. The method of claim 1 wherein the opposing surfaces are substantially smooth.

8. The method of claim 1 wherein at least one of the opposing surfaces is heated to an elevated temperature by a source of heat other than the metal strip.

9. The method of claim 1 wherein the organic film is vinyl resin film, the metal strip is flexible ferrous metal strip, the firm and unyielding opposing surface is formed of metal, and the soft and yielding opposing surface has a hardness of about 30–55 durometers.

10. The method of claim 9 wherein the metal strip is heated to about 300–450° F., the metal strip has a thickness of about 0.01–0.04 inch, the laminating pressure applied by the opposing surfaces is about 40–100 p.s.i., the opposing surfaces are substantially smooth and at least one opposing surface is heated to an elevated temperature by a source of heat other than the metal strip.

References Cited in the file of this patent

UNITED STATES PATENTS

| | | |
|---|---|---|
| 2,068,893 | Stuart | Jan. 26, 1937 |
| 2,695,857 | Lewis et al. | Nov. 30, 1954 |
| 2,702,580 | Bateman | Feb. 22, 1955 |
| 2,728,703 | Kiernan et al. | Dec. 27, 1955 |
| 2,804,416 | Phillipsen | Aug. 27, 1957 |
| 2,817,618 | Hahn | Dec. 24, 1957 |

FOREIGN PATENTS

| | | |
|---|---|---|
| 726,949 | Great Britain | Mar. 23, 1955 |